(12) United States Patent
Onuma et al.

(10) Patent No.: US 10,922,481 B2
(45) Date of Patent: Feb. 16, 2021

(54) VISUAL USER ATTENTION REDIRECTION WHILE FORM FILLING TO ENHANCE AUTO-FILL ACCURACY

(71) Applicant: International Business Machines Corporation, Armonk, NY (US)

(72) Inventors: Shinya Onuma, Tokyo (JP); Yoshiroh Kamiyama, Tokyo-to (JP); Keiji Miura, Yamato (JP); Tomohiro Shimizu, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/441,505

(22) Filed: Jun. 14, 2019

(65) Prior Publication Data

US 2020/0394259 A1  Dec. 17, 2020

(51) Int. Cl.
*G06F 40/174* (2020.01)
*G06F 17/18* (2006.01)
(Continued)

(52) U.S. Cl.
CPC .......... *G06F 40/174* (2020.01); *G06F 3/0482* (2013.01); *G06F 3/04812* (2013.01); *G06F 17/18* (2013.01)

(58) Field of Classification Search
CPC .. G06F 40/174; G06F 3/04812; G06F 3/0482; G06F 17/18
(Continued)

(56) References Cited

U.S. PATENT DOCUMENTS 5,805,158 A * 9/1998 Bertram ............ H04M 1/72527
                                                            715/764
7,343,551 B1 * 3/2008 Bourdev ............... G06F 40/174
                                                            715/224
(Continued)

FOREIGN PATENT DOCUMENTS

JP         2003006558 A      1/2003

OTHER PUBLICATIONS

"Form (HTML)", Wikipedia, This page was retrieved on Sep. 22, 2020, pp. 1-6, <https://en.wikipedia.org/wiki/Form_(HTML)>.
(Continued)

*Primary Examiner* — Andrew R Dyer
(74) *Attorney, Agent, or Firm* — Alexander G. Lochym

(57) ABSTRACT

During presentation of an electronic form on a user interface device of a computer, a most likely input value for a first form field is estimated as the most often historically input value the in the first field, and the user's attention is re-directed to fill the fields in an order different from a natural reading order, according to the best available historical input patterns. This proposed auto-fill value is indicated on the electronic form associated with the first form field. If the user accepts, modifies or replaces the proposed auto-fill value, a most likely value for a second (next) field is estimated. The process is repeated for additional form fields until the form is submitted, saved, or otherwise completed, thereby using strong relationships between two or more input values for different fields as statistically determined from historical completions of the electronic form to predict and assist in future completions.

18 Claims, 8 Drawing Sheets

$$\bar{E}(i) = \sum_{j}^{Choices_i} \left( Pij \sum_{k}^{Autofills_{ij}} CV_{ijk} \right)$$

$\bar{E}(i)$: The final value of Field $i$
$Choices_i$: Choices of Field $i$
$P_{ij}$: Conditional selection probability of Choice $j$ of Field $i$
$Autofills_{ij}$: Auto-filled fields when the user selects Choice $j$ of Field $i$
$CV_i$: Confidence value of the auto-fill in Field $k$

(51) Int. Cl.
*G06F 3/0482* (2013.01)
*G06F 3/0481* (2013.01)

(58) Field of Classification Search
USPC ........................................................ 715/224
See application file for complete search history.

(56) References Cited

U.S. PATENT DOCUMENTS

| | | | |
|---|---|---|---|
| 7,426,496 B2 | 11/2008 | Kristjansson | |
| 7,849,398 B2* | 12/2010 | Dabet | G06K 9/00449 |
| | | | 715/226 |
| 8,010,610 B2* | 8/2011 | Bumiller | H04M 1/2745 |
| | | | 709/206 |
| 8,635,127 B1* | 1/2014 | Shaw | G06Q 40/123 |
| | | | 705/31 |
| 8,645,825 B1* | 2/2014 | Cornea | G06F 40/166 |
| | | | 715/257 |
| 8,935,379 B1* | 1/2015 | Martignoni | G06F 40/174 |
| | | | 709/224 |
| 8,996,981 B2 | 3/2015 | Patton et al. | |
| 9,009,153 B2* | 4/2015 | Khan | G06F 16/951 |
| | | | 707/734 |
| 9,342,495 B2* | 5/2016 | Kimber | G06F 40/174 |
| 9,430,464 B2* | 8/2016 | Carrier | G06F 16/838 |
| 9,436,668 B2* | 9/2016 | Dunn | G06F 40/171 |
| 10,019,136 B1* | 7/2018 | Ozog | H04N 21/466 |
| 10,061,835 B2* | 8/2018 | Blanco | G06F 40/174 |
| 10,607,040 B1* | 3/2020 | Gan | G06F 16/7867 |
| 2005/0198563 A1* | 9/2005 | Kristjansson | G06F 40/174 |
| | | | 715/224 |
| 2008/0120294 A1* | 5/2008 | Davis | G06Q 30/02 |
| 2008/0120324 A1* | 5/2008 | Davis | G06F 16/48 |
| 2008/0120325 A1* | 5/2008 | Davis | G06F 16/4387 |
| 2012/0166929 A1 | 6/2012 | Henderson et al. | |
| 2013/0083999 A1* | 4/2013 | Bhardwaj | G06T 7/90 |
| | | | 382/165 |
| 2013/0262588 A1* | 10/2013 | Barak | H04L 67/22 |
| | | | 709/204 |
| 2014/0032556 A1* | 1/2014 | Bayliss | G06F 16/285 |
| | | | 707/737 |
| 2014/0173408 A1* | 6/2014 | Canaud | G06F 16/235 |
| | | | 715/226 |
| 2014/0258828 A1* | 9/2014 | Lymer | G06F 40/174 |
| | | | 715/224 |
| 2015/0199363 A1* | 7/2015 | Morton | G06F 16/24 |
| | | | 707/722 |
| 2015/0317296 A1* | 11/2015 | Vohra | G06F 40/174 |
| | | | 715/221 |
| 2016/0098405 A1* | 4/2016 | Gorbansky | G06F 16/24578 |
| | | | 707/749 |
| 2016/0217119 A1 | 7/2016 | Dakin et al. | |
| 2017/0046622 A1* | 2/2017 | Gaither | G06F 16/335 |
| 2017/0075873 A1* | 3/2017 | Shetty | G06F 3/0481 |
| 2017/0192949 A1* | 7/2017 | Gaither | G06F 40/174 |
| 2018/0039610 A1* | 2/2018 | Litvak | G06F 16/337 |
| 2019/0258707 A1* | 8/2019 | Terra | G06F 40/174 |

OTHER PUBLICATIONS

Texin et al., "Script Direction and Languages", W3C Internationalization, Sep. 15, 2003, Copyright© 2003-2016 W3C®, pp. 1-7, <https://www.w3.org/International/questions/qa-scripts>.

* cited by examiner

Customer Support Report

(501) Type:
- Question
- Request
- Complaint (502) Product:
- Refrigerator
- Toaster
- Dishwasher (503) Customer's age:
- Young
- Middle
- Old

$$\bar{E}(i) = \sum_{j}^{Choices_i} (P_{ij} \sum_{k}^{Autofills_{ij}} CV_{ijk})$$

700

$\bar{E}(i)$: The final value of Field $i$
$\boldsymbol{Choices_i}$: Choices of Field $i$
$\boldsymbol{P_{ij}}$: Conditional selection probability of Choice $j$ of Field $i$
$\boldsymbol{Autofills_{ij}}$: Auto-filled fields when the user selects Choice $j$ of Field $i$
$\boldsymbol{CV_i}$: Confidence value of the auto-fill in Field $k$

FIG. 7

VISUAL USER ATTENTION REDIRECTION WHILE FORM FILLING TO ENHANCE AUTO-FILL ACCURACY

BACKGROUND

This invention relates generally to methods and systems for assisting users in filling in fields and making choices in electronic forms, such as online forms.

Computer users encounter electronic forms often, some of which are generated by locally-executed application programs, such as legal document generation programs to prepare a will. Some electronic forms are encountered by users while browsing online, as special versions of web pages, and may be referred to as webforms, web forms, or HTML forms. In both general scenarios, the form-based user interface allows and directs the user to input certain data. Some "fields" may allow for free, unconstrained entry (text, numbers, etc.), while other fields may provide more constrained structure, such as radio buttons, drop down lists, and value range checking. The visual presentation of the forms may resemble a corresponding paper form to assist the user who may already be familiar with a particular paper form, or they may resemble computer screens which do not have paper counterparts.

In HTML implementations, electronic forms may be encoded between FORM tags, including a GET or POST method for submitting the data to the corresponding server. The graphical user interface (GUI) elements may include, but are not limited to elements such as a text entry box, an email address input field, a number input field, a password input field, a radio button, a file upload or download control, a reset entries control, a submit control, etc.

For the purposes of this disclosure, all of these different electronic forms and user interface technologies will be referred to collectively as electronic forms. Where differentiation is needed, it will be provided, otherwise, those ordinarily skilled in the relevant arts will readily understand that the various objects and benefits of the present invention can be realized with most, if not all embodiments of electronic forms.

SUMMARY

According to an embodiment of the present invention, during presentation of an electronic form on a user interface device of a computer, a most likely input value for a first form field is estimated as the most often historically input value the in the first field, and the user's attention is re-directed to fill the fields in an order different from a natural reading order, according to the best available historical input patterns. This proposed auto-fill value is indicated on the electronic form associated with the first form field. If the user accepts, modifies or replaces the proposed auto-fill value, a most likely value for a second (next) field is estimated as determined statistically to the accepted, modified or replaced value in the first form field. The process is repeated for additional form fields until the form is submitted, saved, or otherwise completed, thereby using strong relationships between two or more input values for different fields as statistically determined from historical completions of the electronic form to predict and assist in future completions of the electronic form.

BRIEF DESCRIPTION OF THE DRAWINGS

FIG. 5 illustrates the logical completion options for at least a second embodiment of the invention using a second exemplary electronic form.

FIG. 7 illustrates a refreshed portion of a graphical display on a User Interface (UI) device with the exemplary electronic form of FIG. 6.

DETAILED DESCRIPTION OF EMBODIMENT(S) OF THE INVENTION

Figure 1:
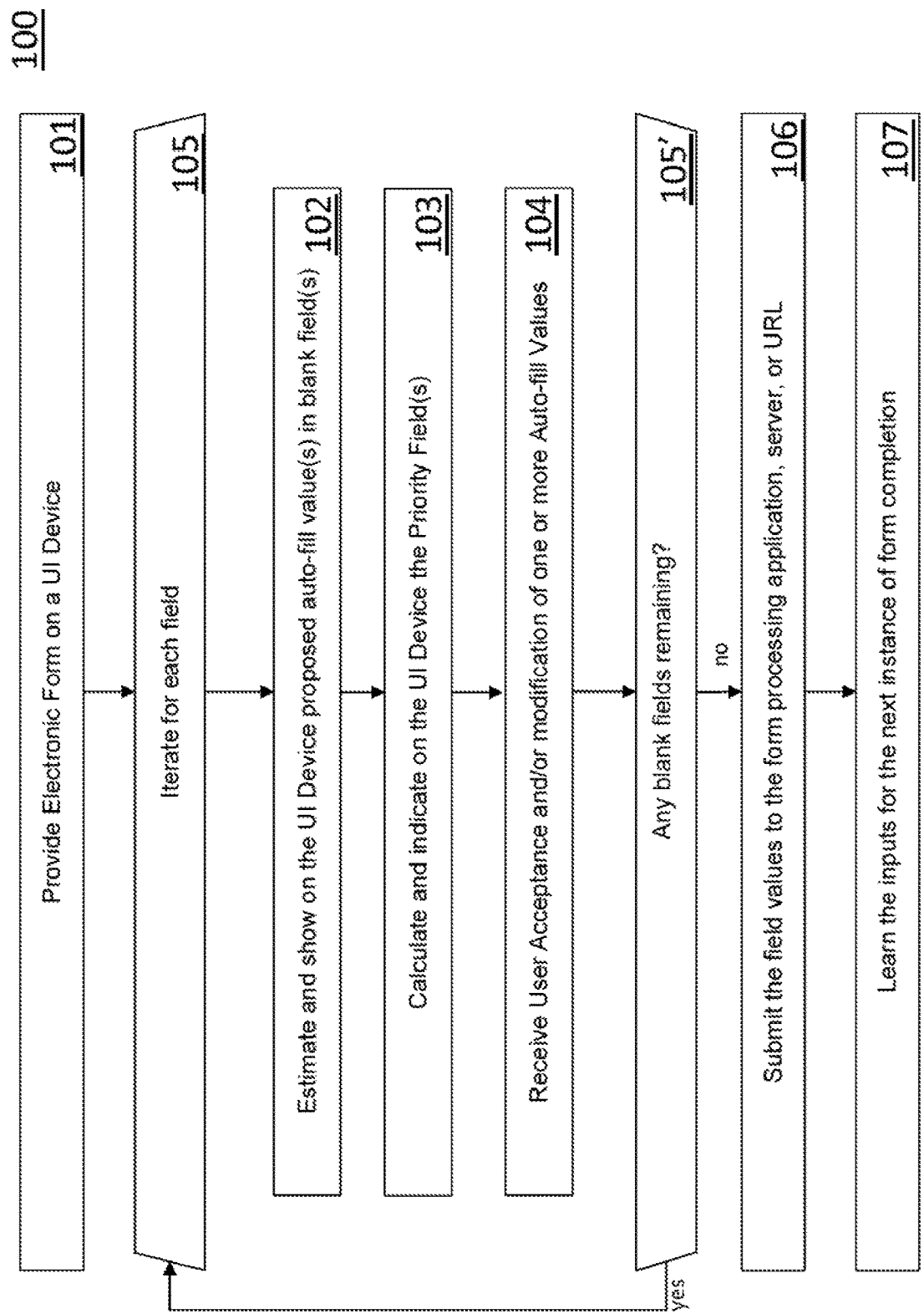
FIG. 1 illustrates a generalized process autonomously performed by various embodiments according to the present invention.

Many technologies are presently known assisting computer users enter information ("fill") an electronic form faster. For example, some web browsers have a capability to record previous electronic form field entry values associates with form field labels into a web browsing history. Then, when another electronic form is encountered by the user which has a field with the same or similar label, the web browser function can automatically propose the previously-entered value for the user. In another example, a user may encounter an electronic form which requires a physical street address, and the user may be prompted to enter a postal code before a city, state or province value. If the postal code value is recognized, it is used by the electronic form issuing server to look up the associated city, state or province values from a pre-existing dictionary, and those values for city, state or province can be auto-filled in their appropriate fields for the user, as well.

The present inventors have recognized that, while these existing technologies are useful at auto-filling values which can be determined unambiguously, there are many other electronic form field scenarios where the determination is more ambiguous and less deterministic and the current form-filling technologies fail or are insufficient to meet the needs in the art. The present inventors have recognized that many users will attempt to fill a particular form field based on the cultural norm regarding reading order and reading direction. For example, a user from a culture which writes and reads language from left to right, top to bottom, will attempt to fill the first form field that appears on the user interface in the most upper, left position. If it is simply a vertical stack of form fields, the user will, without thought, attempt to complete the topmost field, due to reading habit (i.e., the user's eyes fall upon this field first because of the learned habit of reading order). A user from another culture in which the reading and writing order is right-to-left, and/or top-to-bottom, may naturally attempt to fill a form's most upper-right field. Electronic form designers inherently follow these norms when designing a form.

According to the World Wide Web Consortium (W3C), many languages are written and read primarily from left to right (LTF), and secondarily from top to bottom (TTB), such as Latin, Cyrillic, modern Greek, Indic, and some southeastern Asian scripts. According to W3C, some other languages are written and read from right-to-left (RTL), such as Arabic, Azeri/Azerbaijani, Bakhtiari, Balochi, Farsi/Persian, Gilaki, Javanese, Kashmiri, Kazakh, Kurdish (Sorani), Malay, Malayalam, Pashto, Punjabi, Qashqai, Sindhi, Somali, Sulu, Takestani, Turkmen, Uighur, Western Cham, Urdu, Hebrew, Ladino/Judezmo, Yiddish, Mandekan, Assyrian, Modern Aramaic Koine, Syriac, Dhivehi/Maldivian, and Tamashek. Some other languages, according to W3C, are more flexible in their writing and reading direction, and can include top to bottom (TTB) directionality, such as the ideographic languages, including Japanese, Korean and Chinese.

The present form-filling technologies often rely on field-value pairs which must have a strong relationship, such as [first_name]< >[last_name] or [city]< >[postalcode], but which fails when the field-value pair has a weak relationship, such as a flight departure time or a preferred nickname value.

In practice, there actually are only a few fields which exhibit strong relationship between the field label and the field value for a particular user. However, the present inventors have realized that, even for field-value pairs with weak relationships, many users often input similar patterns, albeit not identical values, across a variety of electronic form types, and especially across electronic forms associated with business application programs.

For example, consider an application program, running locally or remotely on a server, which relates to collection of data for defects in products. In particular, consider an electronic form in which a user enters a description of the defect in a first field, and then assigns a specific expert to resolve the defect. Certain products defects will be most often be assigned to certain experts based on each expert's skills, experience and authority level. But, the field-value pair for entering the defect description may have a weak relationship because the defect description values may be unstructured natural language (NL). And, the field-value pair for entering an assigned expert may also have a weak relationship between the field label and the values entered.

So, present-day electronic forms often do not perform well with existing auto-filler technologies because the form field with the strongest field-value pair historical completion data may not fall at the natural starting point for the user, depending on the user's habit for reading order. This leads the user to complete a sub-optimal form field first, which then reduces the form filler technology's ability to accurately predict and propose values for the rest of the fields.

However, the inventors have recognized that, when the two fields are considered together and relative to each other, there may be a much stronger relationship between the values entered in the defect description and the values entered in name of the assigned expert due to the expertise-experience-authority factors.

Thus, the present inventors have discovered a stronger statistical relationship may exist between two values entered for two different fields, as illustrated in the Table 1 in which a weak relationship is shown as <<weak >> and a strong relationship is shown as <strong>.

TABLE 1

Example Field-Field Strong Relationship

| Field Label | Relationship | Value Entered by User |
|---|---|---|
| "Problem Description" | << weak >> | "{unstructured NL}" |
|  |  | ∧ |
|  |  | strong |
|  |  | ∨ |
| "Assigned Expert" | << weak >> | Drop-down list of experts |

The present invention improves the autonomous functioning of a computer, whether a local processor or a remote server, or a combination of both, to auto-fill electronic form field values with values which the computer estimates based upon detected past strong field-field relationships and input patterns of the form. In at least one embodiment, the user's attention is re-directed from the first natural reading order field (e.g., top-left or top-right, etc.) to a form field for which the strong historical data is available to encourage the user to fill that field first. If the user follows the on-screen queue, such as an icon, color change, flashing prompt, etc., then the enhanced form filling logic can make best use of the strong field-field historical data, and then redirect the user to a next field to complete, which may not be the next field according to the user's natural reading order habit. This process of prompting the user to input field values in a non-reading order continues, each time with the machine logic prompting for the next best field to complete to make the best use of the available historical data, thereby improving the accuracy and acceptance rate of the proposed field values by the auto-filler.

In at least one embodiment according to the present invention, the field value estimations can be based on the detected historical input patterns only for the current user. In at least another embodiment according to the present invention, the field value estimations can be based on detected historical input patterns for one or more other users besides the current user. In at least another embodiment of according to the present invention, the autonomous functioning of a computer, whether a local processor or a remote server, or a combination of both, to suggests to a user an optimal sequence for filling fields in an electronic form, such as which field is best filled next after filling a current field, based upon a computer-determined confidence level associated with the currently estimated value for the current field.

A generalized process (100) autonomously performed by various embodiments is shown in FIG. 1. The computer user encounters an electronic form by navigating a web browser to a web form, by executing an application program, or other event. The computer provides (101) the form to the user on a user interface (UI) device using any conventional electronic form method or format, such as a web page, a pop-up dialog, a portable document format (PDF) document, etc., by rendering the graphical depiction of form labels, user-fillable fields, and optional, other textual and/or graphical information to direct and allow the user to input information into the field values. As previously described, some fields may allow the user to enter unstructured natural language text, and some fields may provide or enforce structure to the allowed user input, such as radio buttons, check boxes, and value-checked text and/or numbers, all within the context of known electronic form technology. The computer then estimates (102) the most likely, most confident values for each blank field in the electronic form based upon any current user inputs into the electronic form and based upon strong relationships between historical entries in two or more fields of the electronic form. The computer shows the estimated values in each associated field (e.g., proposes auto-fill values) to the user on the User Interface device, either locally or remotely.

The computer logic provides a visual indication (103) on the user interface device for which field is good or best to be filled first (or next) to get improved auto-fill values for the other fields. This visual indication (103) may redirect the user's attention away from a field which would be the first (or next) field to complete according to a natural reading order, and instead encourage or prompt the user to complete a field for which the stronger (or strongest) relationships between historical entries in two or more fields of the electronic form are recorded by the computer.

The computer receives (104) from the user, via a computer network or local user interface device, one or more acceptances and/or one or more modifications of the one or more auto-filled values. In some embodiments, the user-completed field may be different from the field provided with the auto-fill indicator to allow the user to avoid, ignore or override the suggested first and next fields (e.g., the suggested sequence of fields).

Optionally, the computer repeats (105, 105') the estimation (102), prioritization (103), and receiving (104) until the electronic form is completed, or until the computer receives a user command to submit (106) the form as-is. In the context of an electronic form document, such as a PDF file, saving the current file with the field values is considered at least one form of submission, as is transmitting the completed form and/or the field values to a form processing application program, server, or uniform resource locator (URL).

The computer learns the current inputs of the newly-completed form for better estimation for the next times. According to at least one example embodiment, the learning is accomplished by incrementing a count for each input value associated with each field label, and optionally associated with an identification of the form, such as a form name, a file name, or a URL from which the form was transmitted to the user's client device. In at least another example embodiment, a machine learning model is updated such that relationships between field labels and filled values are represented by coefficients, and in which proposed values which were modified or rejected by a user result in a reduction in the associated coefficient, and in which accepted proposed values result in an increase in an associated coefficient. In this latter example, any input value which has not historically been included in the model may be added to the model, and initialized with a default coefficient for a relationship to at least a field label.

Coefficients for relationships between form identifiers and field labels and/or input values may also be included in the machine learning models, in some embodiments. In such models, a low coefficient would indicate a weaker relationship between a field-value pair or among a form-field-value triplet, and a higher coefficient would indicate a stronger relationship between a field-value pair or among a form-field-value triplet. Further, according to embodiments of the present invention, counts or coefficients are initialized and updated between field values associated with different field labels, to record historical weakness and strength of relationship between the input values for use in the estimation calculations.

Figure 2:
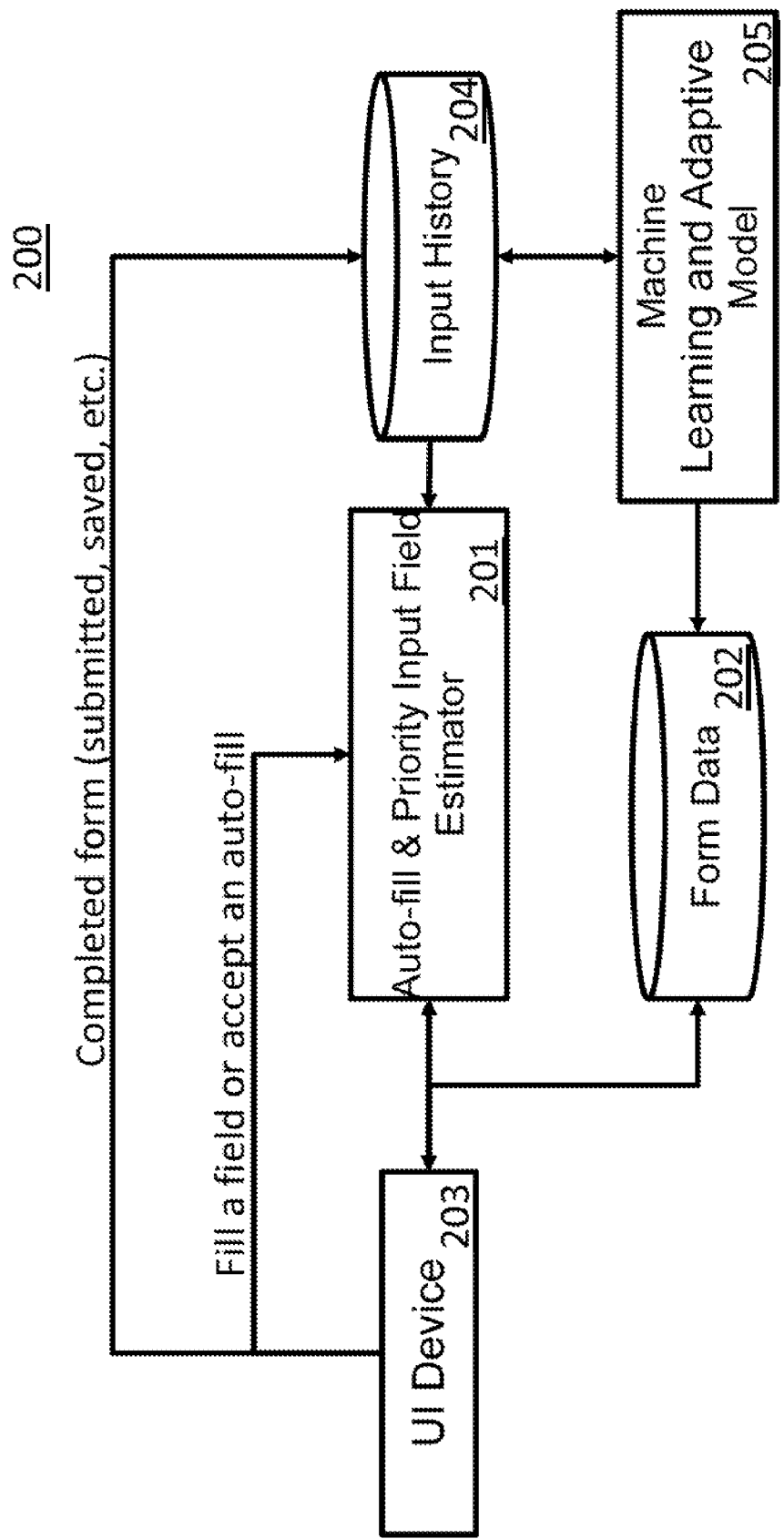
FIG. 2 illustrates an example logical architecture of at least one embodiment according to the invention.

Referring to FIG. 2, an example logical architecture (200) of at least one embodiment according to the invention is shown. The auto-fill and field priority engine (201) communicates locally or remotely with a User Interface (UI) Device (203), to provide and collect form data (202) for a specific instance of the electronic form being encountered by a user. Each user acceptance of a proposed field value, modification of a proposed field value, or filling of another form field is received by the engine (201), and when the form is completed (saved, submitted, etc.), input history is updated (or initialized for the first instance of the electronic form). Optionally, machine learning and an adaptive model for one or more of the particular form, the particular user, multiple forms, and multiple users is updated (or initialized) to feed into future estimations by the engine (201) for proposed auto-fill values (202) in future instances of the electronic form, similar electronic forms, the same user, and/or other users.

According to other embodiments of the invention, past input histories can be shared, aggregated, and otherwise compared across similar users, such as members in the same support team, to gather more statistics to improve the accuracy and confidence of the estimated auto-fill values. Such sharing, aggregating and comparing can provide larger sample sets, leading to improved averaging and prediction function smoothing. In some embodiments, some information may be designated as sensitive to prevent sharing, aggregating or comparing.

In other embodiments of the invention, historical data can be weighted, such as applying greater weight to more recently entered form field values, and applying lesser weight to older field values. Weighting in this manner allows the engine to adapt to changing conditions without requiring explicit modification of logical rules.

Some embodiments may be realized such that the priority fields (best next field) indication is excluded. In embodiments which include the priority field determination and indication, such indications may include, but are not limited to, changing colors of the field labels, changing colors of the field entry points or areas, showing icons or tooltips near the field label or entry points, emphasis using bold text or lines, flashing, moving a pointer, enlarging or zooming an area, etc.

Figure 3:
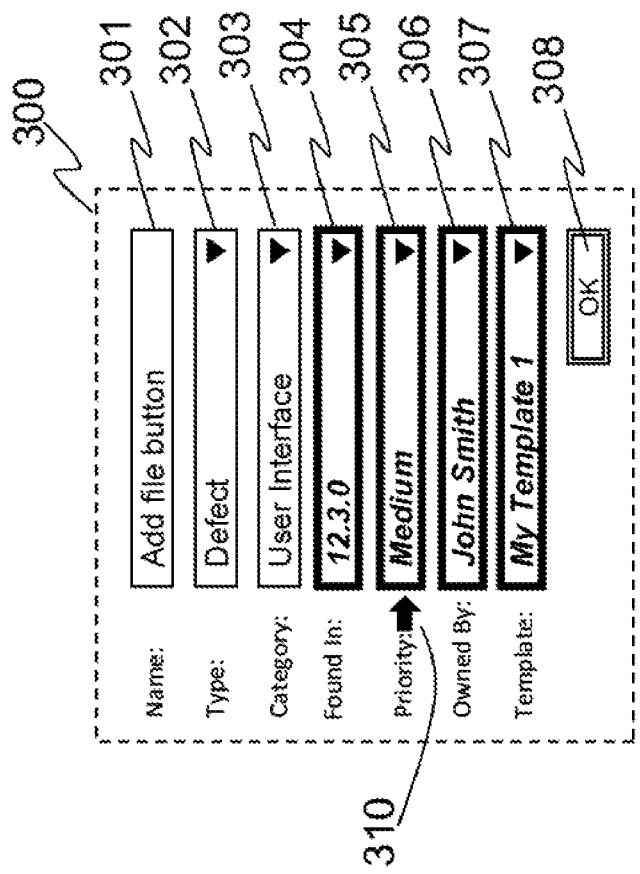
FIG. 3 illustrates a portion of a graphical display on a User Interface (UI) device with a first exemplary electronic form according to at least one embodiment of the invention.

Referring to FIG. 3, a portion (300) of a graphical display on a User Interface (UI) device is shown with an exemplary form having multiple fields (301-307) for creating a defect record including various information about it, including assigning the resolution task to an specific expert. It has an "OK" button (308) which functions as a submit or save button when the user has completed all the fields he or she wishes to complete. In this embodiment, the arrow icon (310) indicates the calculated "best" field to be filled next after the user has selected "Defect" from a drop-down list (302), entered a name for the new record "Add file button" (301), and selected a "User Interface" from a category field list (303). The invention performs its estimations for the auto-fill values for the remaining fields (304-307) based on the history and models, and preferably provides an indication of the auto-fill suggestions such as using heavier (wider) entry box outlines and bolded italicized entry text, as shown in this black-and-white illustration for the purposes of this patent disclosure. In practice, other color and shade-based methods may be utilized to indicate the estimated and proposed fields, such as filling the entry boxes with gray, and showing the text in red.

According to at least one embodiment of the invention, the computer automatically determines that the "priority" field (305) is the best field to complete next, and indicates this by showing the arrow icon (310) adjacent to the field. In this example, the user may wish to accept the proposed priority level of "medium", or may select the drop down list icon to select another priority level for this form field entry.

According to one embodiment of the present invention, as the user reviews, accepts, or modifies each proposed entry, the graphical display for that entry is de-emphasized, such as by removing the heavier entry box outlines (or shading) and changing the text to normal attributes (or color).

Figure 4:
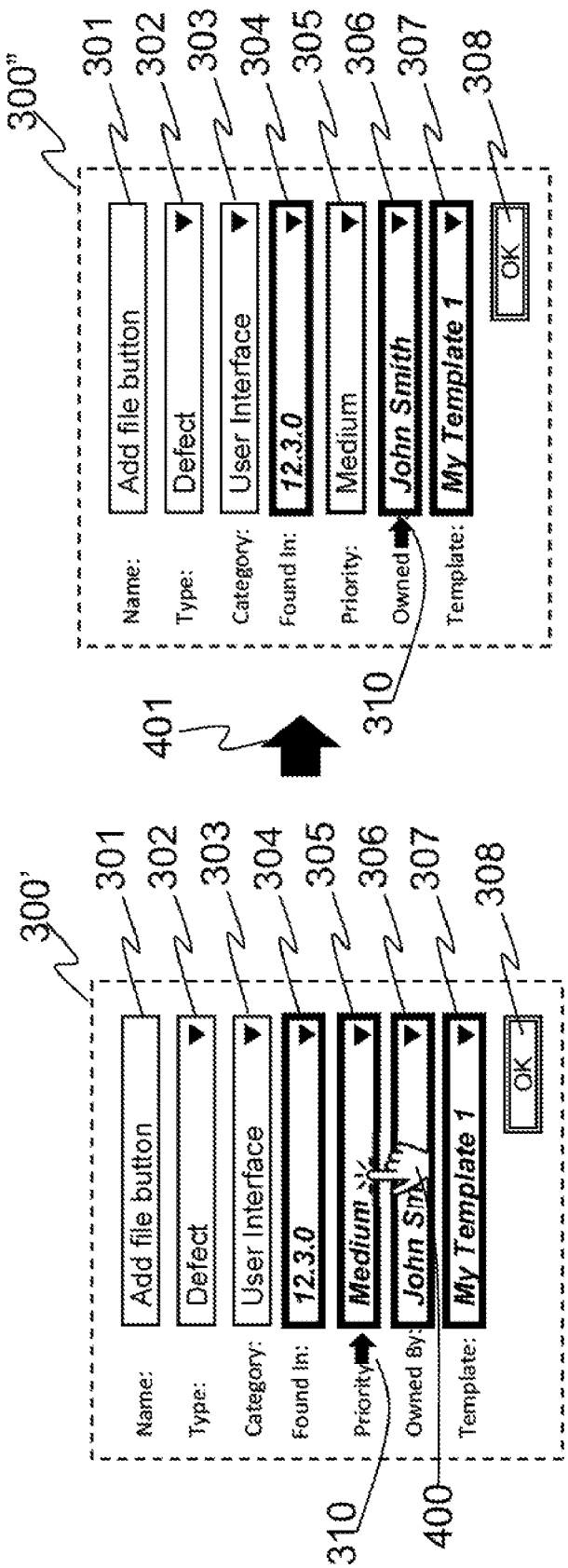
FIG. 4 illustrates a refreshed portion of a graphical display on a User Interface (UI) device with the exemplary electronic form of FIG. 3.

FIG. 4 illustrates (300') the user interface actions of at least one embodiment, in which the user can accept a proposed auto-filled value (305) by tapping (400), clicking, or tabbing into the entry field and typing Return or Enter. While the arrow icon (310) indicates to the user the system's suggestion of the best field to complete next according to the available statistical history and machine learning models, the user may select another field next according to his or her preference. After the user has accepted the auto-fill value (305) in this example, the user interface graphical depiction is refreshed (401) to remove the auto-fill indications (bolding, coloring, shading), and the next-best icon (310) is moved by the system to the field (306) which would be best to complete next, according to the available statistical history and machine learning models, as shown (300").

In some embodiments, the user is allowed to modify or replace the proposed value(s) for each field, and these changes are fed back to the engine, the history and the models for updating (learning). Following such a rejection, modification or replacement of a proposed value, the system, in at least one embodiment, updates its determination of the next best field for completion, and moves the next-best icon (310) accordingly.

Further, in some embodiments, if the system determines that a confidence level for an auto-fill value for a particular field does not meet a minimum threshold, then no auto-fill value will be shown in the associated field entry area or box on the graphical user interface. However, if the user enters a value, this value will then be fed back to the engine, the history and the models for updating (learning).

In other embodiments, more than one next-best icons may be provided to indicate to the user that there are multiple sequence options to complete the form in a manner that will enable best use of the history and models. And, in other embodiments, the next-best indication may be omitted entirely, especially for new usages of a form in which the history and/or machine learning models are at or near their default initialized states.

We now turn to disclosing the specific rules, logic, and computer operations which embodiments of the auto-fill estimator engine according to present invention may include. FIG. 5 provides a small electronic form illustration for use in the next example disclosure, in which there are three fields for a customer support report form shown on a portion of a user interface device (500). There are three fields shown, each having a drop-down list style of structured user input: type (501) of report (question, request, or complaint), the product (502) about which the report is made (refrigerator, toaster, or dishwasher), and the customer's age (503) making the report (young, middle, old). In this type of structured input, for the purposes of this example, we will presume that each of the drop-down lists allows the user to select one and only one option. Now, further presume for the purposes of this example illustration, that there have been five instances of completion (submission, saving, etc.) of this form, as shown in Table 2.

TABLE 2

Example History of Form Completions in FIG. 5

| Instance | Type (501) | Product (502) | Age (503) |
|---|---|---|---|
| 1st | Question | Refrigerator | Young |
| 2nd | Request | Refrigerator | Young |
| 3rd | Complaint | Refrigerator | Middle |
| 4th | Complaint | Dishwasher | Old |
| 5th | Question | Dishwasher | Middle |

From this example short history (just 5 instances of completion of the form), the system can calculate that, for input into the type of report (501) field, there is a 40% probability it will be a question, a 20% probability it will be a request, and a 40% probability it will be a complaint. With longer histories, the probabilities would be expected to be more accurate in predicting future entries, but for the purpose of brevity in this disclosure, we use just the five instances here. Similarly, the system can calculate that, for the product (502) field about which the report is being created, there is a 60% probability that it will be regarding a refrigerator, a 0% probability that it will be regarding a toaster, and a 40% probability that it will be regarding a dishwasher. Similarly, the system can calculate from this example history that, for the reporting customer's age, there is a 40% probability that it will be a young customer, a 40% probability that it will be a middle-aged customer, and a 20% probability that it will be an older customer.

Figure 6:
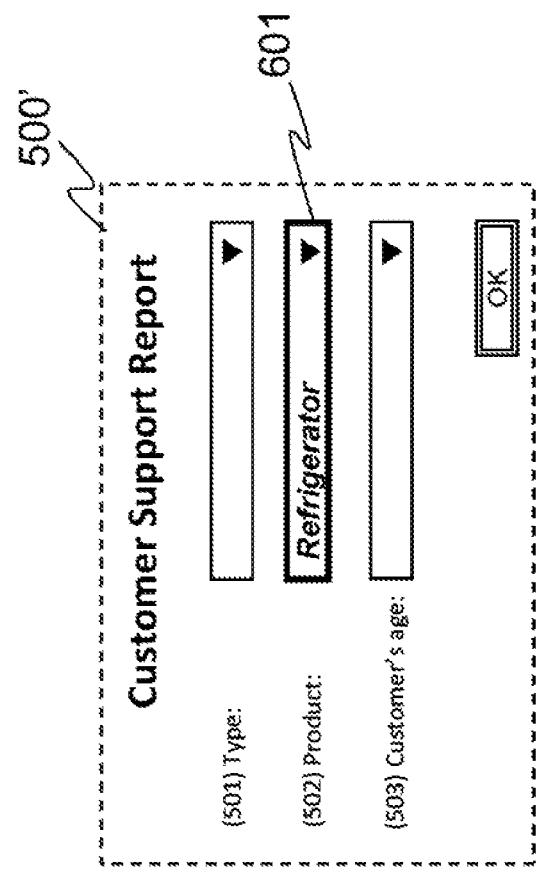
FIG. 6 illustrates a portion of a graphical display on a User Interface (UI) device with the second exemplary electronic form of FIG. 5.

Referring to FIG. 6, upon the next instance (6th) of providing, by a computer, the electronic form on a portion of a user interface device, the electronic form (500') is displayed on a portion of a computer graphical user interface with the three fields (501, 502, 503) in which the product field (502) is auto-filled with the value "refrigerator" because of the clear probability (60%) that this is the value which will be entered by the user. The other two fields (501, 503) are not shown as being auto-filled by the engine because both fields have no clear statistical single value which is most likely or most probable to be entered.

To determine the suggestion for the first (or next) best field for the user to complete so that the next-best icon can be appropriately shown on the user interface, the system will determine a confidence value for the estimated auto-fill value(s). In this example embodiment, the system determines a conditional selection probability from the historical data to use as the confidence value for each entry. The auto-filled value and the associated confidence value for every next possible action are calculated. For example, if the user is currently selecting the value "question" from the drop-down list of options for the type (501) field, then the system determines that there is a 50% probability that the user will next enter "refrigerator" in the product (502) field, a 50% probability that the user may next enter "dishwasher" in the product (502) field, a 50% probability that the user may next enter "young" in the customer age (503) field, and a 50% probability that the user may next enter "middle" in the customer age (503) field, according to the example history of Table 2. The remaining system probability and confidence and determinations are shown in Table 3.

TABLE 3

Example Confidence Level Determinations

| If next field is: | then fields to auto-fill: | with confidence of: |
|---|---|---|
| Question (501) | none | none |
| Request (501) | 2 | 100% |
| Complaint (501) | none | none |
| Refrigerator (502) | 1 | 66% |
| Toaster (502) | none | none |
| Dishwasher (502) | none | none |
| Young (503) | 1 | 100% |
| Middle (503) | none | none |
| Old (503) | 2 | 100% |

This example is much easier to comprehend with the small size of the electronic form (just three fields), the small number of options per field (just three) and the very short history (just 5 previous instances of the form completion). In practice, many electronic forms may be much larger in size and count of fields, many field entry options will be much greater, and the history will be much longer, so the probabilities for each entry relative to other entries in other fields will be more accurate. Fewer probabilities would be expected to be 100% or 0% in practice.

FIG. 7 illustrates a generalized specific rule (700) according to the present invention, leading to the actual results for the present invention of:

$$\text{Type of Report (501): } (100+100)*20\%=40\% \quad \text{EQ. 1}$$

$$\text{Product (502): } 66*60\%=40\% \quad \text{EQ. 2}$$

$$\text{Customer Age (503): } [100*40\%]+[(100+100)*20\%]=80\% \quad \text{EQ. 3}$$

Figure 8:
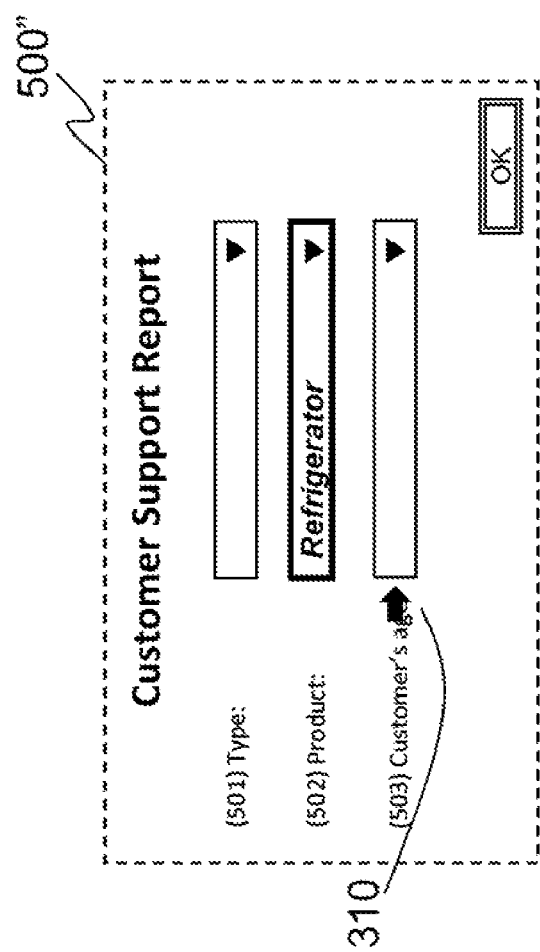
FIG. 8 illustrates a portion of a graphical display on a User Interface (UI) device with an exemplary electronic form as provided with a next-best icon according to at least one embodiment of the invention.

In this example, the system has determined, using the specific machine logic rule (700), that the most likely (80%) field that the user will complete first (or next) is the customer age (503). So, the system refreshes the user interface to show the electronic form (500") with a next-best icon (310) placed next to the customer's age field (503), as shown in FIG. 8.

Computer Program Product Embodiments. The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Conclusion. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process or processes.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method comprising:
    presenting, by a computer, of an electronic form having a plurality of fields arranged in a natural reading order on a user interface device;
        determining, from digitally-recorded historical input patterns of the electronic form, a strongest field-field pair relationship within the plurality of fields, wherein the strongest field-field pair relationship is determined by applying greater weight to more recently entered form field values in the digitally-recorded historical input patterns and by applying lesser weight to older field values in the digitally-recorded historical input patterns, and determining a confidence value for each of the plurality of fields using the applied greater weight and lesser weight, and wherein the strongest field-field pair relationship has the highest confidence value;
        estimating, from the historical input patterns, a most likely input value for at least one field of the strongest field-field pair having the strongest relationship according to the determining;
        providing, by a computer on the user interface device, the estimated input value for the at least one field as a first proposed auto-fill value;
        presenting, by a computer on the user interface device, the first proposed auto-file value using a graphical indicator;
    responsive to receiving, by a computer, via a user interface device, the acceptance of the first proposed auto-fill value or input of a replacement value in the first electronic form field:
        determining, by a computer, from the digitally-recorded historical input patterns of the electronic form, a next stronger field-field pair relationship within the plurality of fields;
        estimating, by a computer, a most likely next input value for the determined next electronic form field correlated historically to the value accepted or input into the first electronic form field;
        indicating the estimated next input value for the next electronic form field, by a computer, in the electronic form presentation, as a proposed auto-fill value for the next form field; and
        redirecting a user's attention from the first field to the next field having the next proposed auto-file value by moving or changing the graphical indicator.

2. The method as set forth in claim 1 further comprising repeating the steps of estimating a plurality of most likely next input values for a next electronic form fields and moving or changing the graphical indicator to redirect the user's attention from a natural reading order until all electronic form fields are complete or until the computer receives a command to complete the form from a user interface device.

3. The method as set forth in claim 2 wherein the command comprises one or more commands selected from the group consisting of a submit command, a save command, and a finish command.

4. The method as set forth in claim 1 wherein the estimating comprises calculating, by the computer, a confidence level of each estimated most likely input value, and wherein the providing of each proposed auto-fill values is disabled responsive to a corresponding confidence level falling below a predetermined threshold.

5. The method as set forth in claim 1 wherein the graphical indication comprises an icon.

6. The method as set forth in claim 1 wherein the graphical indication comprises one or more graphical indicators selected from the group consisting of a color, a change in color, a size, and change in size, a flash, a highlight, a font change, and text emphasis.

7. A computer program product comprising:
a computer readable storage medium; and program instructions encoded by the computer readable storage medium for causing a processor to, when executed, perform steps of:
  responsive to presentation, by a computer, of an electronic form having a plurality of fields arranged in a natural reading order on a user interface device:
    determining, from digitally-recorded historical input patterns of the electronic form, a strongest field-field pair relationship within the plurality of fields, wherein the strongest field-field pair relationship is determined by applying greater weight to more recently entered form field values in the digitally-recorded historical input patterns and by applying lesser weight to older field values in the digitally-recorded historical input patterns, and determining a confidence value for each of the plurality of fields using the applied greater weight and lesser weight, and wherein the strongest field-field pair relationship has the highest confidence value;
    estimating, from the historical input patterns, a most likely input value for at least one field of the strongest field-field pair having the strongest relationship according to the determining;
    providing, by a computer on the user interface device, the estimated input value for the at least one field as a first proposed auto-fill value;
    presenting, by a computer on the user interface device, the first proposed auto-file value using a graphical indicator;
  responsive to receiving, by a computer, via a user interface device, an acceptance of the first proposed auto-fill value or input of a replacement value in the first electronic form field:
    determining, by a computer, from the digitally-recorded historical input patterns of the electronic form, a next stronger field-field pair relationship within the plurality of fields;
    estimating, by a computer, a most likely next input value for the determined next electronic form field correlated historically to the value accepted or input into the first electronic form field;
    indicating the estimated next input value for the next electronic form field, by a computer, in the electronic form presentation, as a proposed auto-fill value for the next form field; and
    redirecting a user's attention from the first field to the next field having the next proposed auto-file value by moving or changing the graphical indicator.

8. The computer program product as set forth in claim 7 wherein the program instructions further comprise instructions for repeating the steps of estimating a plurality of most likely next input values for a next electronic form fields and moving or changing the graphical indicator to redirect the user's attention from a natural reading order until all electronic form fields are complete or until the computer receives a command to complete the form from a user interface device.

9. The computer program product as set forth in claim 8 wherein the command comprises one or more commands selected from the group consisting of a submit command, a save command, and a finish command.

10. The computer program product as set forth in claim 7 wherein the estimating comprises calculating, by the computer, a confidence level of each estimated most likely input value, and wherein the providing of each proposed auto-fill values is disabled responsive to a corresponding confidence level falling below a predetermined threshold.

11. The computer program product as set forth in claim 7 wherein the graphical indication comprises an icon.

12. The computer program product as set forth in claim 7 wherein the graphical indication comprises one or more graphical indicators selected from the group consisting of a color, a change in color, a size, and change in size, a flash, a highlight, a font change, and text emphasis.

13. A system comprising:
a computer processor;
a computer readable storage medium; and
program instructions encoded by the computer readable storage medium for causing a processor to, when executed, perform steps of:
  responsive to presentation, by a computer, of an electronic form having a plurality of fields arranged in a natural reading order on a user interface device:
    determining, from digitally-recorded historical input patterns of the electronic form, a strongest field-field pair relationship within the plurality of fields, wherein the strongest field-field pair relationship is determined by applying greater weight to more recently entered form field values in the digitally-recorded historical input patterns and by applying lesser weight to older field values in the digitally-recorded historical input patterns, and determining a confidence value for each of the plurality of fields using the applied greater weight and lesser weight, and wherein the strongest field-field pair relationship has the highest confidence value;
    estimating, from the historical input patterns, a most likely input value for at least one field of the strongest field-field pair having the strongest relationship according to the determining;
    providing, by a computer on the user interface device, the estimated input value for the at least one field as a first proposed auto-fill value;
    presenting, by a computer on the user interface device, the first proposed auto-file value using a graphical indicator;
  responsive to receiving, by a computer, via a user interface device, an acceptance of the first proposed auto-fill value or input of a replacement value in the first electronic form field:
    determining, by a computer, from the digitally-recorded historical input patterns of the electronic form, a next stronger field-field pair relationship within the plurality of fields;
    estimating, by a computer, a most likely next input value for the determined next electronic form field correlated historically to the value accepted or input into the first electronic form field;

indicating the estimated next input value for the next electronic form field, by a computer, in the electronic form presentation, as a proposed auto-fill value for the next form field; and redirecting a user's attention from the first field to the next field having the next proposed auto-file value by moving or changing the graphical indicator.

14. The system as set forth in claim 13 wherein the program instructions further comprise instructions for repeating the steps of estimating a plurality of most likely next input values for a next electronic form fields and moving or changing the graphical indicator to redirect the user's attention from a natural reading order until all electronic form fields are complete or until the computer receives a command to complete the form from a user interface device.

15. The system as set forth in claim 14 wherein the command comprises one or more commands selected from the group consisting of a submit command, a save command, and a finish command.

16. The system as set forth in claim 13 wherein the estimating comprises calculating, by the computer, a confidence level of each estimated most likely input value, and wherein the providing of each proposed auto-fill values is disabled responsive to a corresponding confidence level falling below a predetermined threshold.

17. The system as set forth in claim 13 wherein the graphical indication comprises an icon.

18. The system as set forth in claim 13 wherein the graphical indication comprises one or more graphical indicators selected from the group consisting of a color, a change in color, a size, and change in size, a flash, a highlight, a font change, and text emphasis.

* * * * *